United States Patent Office 3,250,705
Patented May 10, 1966

3,250,705
METHOD OF REMOVING IMPURITIES FROM WATER AT ELEVATED TEMPERATURES
Joseph A. Levendusky, Bayonne, N.J., assignor to Union Tank Car Company, Chicago, Ill., a corporation of New Jersey
No Drawing. Filed Mar. 8, 1963, Ser. No. 263,749
24 Claims. (Cl. 210—26)

This application is a continuation-in-part of applicant's copending application Serial No. 184,542, filed April 2, 1962, now abandoned, and assigned to the assignee of the present application.

This invention relates to a method of removing impurities from water and more particularly to a method of removing impurities from high temperature water.

It is well known that boiler feed water used in steam generating systems for an electrical power plant requires an exceptionally high degree of purity. In the environment of high temperature steam, small amounts of impurities or contaminants, such as metallic salts, undissolved solids and silica and the like, in the boiler feed water can cause scale, sludge and corrosive deposits in the steam generating system. In the turbine the ensuing pitting, erosion, or build-up of deposits will cause a reduction of turbine efficiency. Furthermore, pitting, erosion, or build-up of deposits may create spots of excessive heat concentration in the boiler tubes of the system, which may result in boiler tube failures.

In an effort to avoid these deleterious effects, the water initially introduced into the system and the boiler make-up feed water subsequently introduced into the system are purified by demineralizing. This common purification method comprises passing the water through a bed or beds of anion and cation exchange resin particles in the size range of 20 to 50 mesh, hereinafter referred to sometimes as "large bead" resin particles. The demineralization of the water is conducted outside the steam generating system where the temperature of the water is well below those water temperatures encountered within the steam generating system.

However, in a steam generating system for an electrical power plant a further problem is presented. The various components of the electrical power plant system, such as the tanks, pipes, heat exchange tubes, pumps, turbine, boiler and condenser are made of metal. Turbine blades are usually made of alloys containing such metals as steel, nickel, copper, manganese, aluminum, or bronze. During operation, because of wear, internal pressures, vibration, heat and other stresses on the components, small quantities of metallic substances are picked up by the water as it passes through these components. Other dissolved and undissolved contaminants are also collected from leakage or weepage in the condenser, the make-up feed water, or metallic deposits during startups.

It is desirable to also remove these impurities from the water in the steam generating system and it is advantageous to remove these dissolved and undissolved impurities from the condensate water. However, the condensate water, having passed through one or more heating stages in the steam generating system, will have attained a temperature in the range of 180 to 450° F. Heretofore, strong base or weak base anion exchange resin particles in the hydroxide form have not been used at temperatures above 175° F., because these resin particles degrade excessively, causing loss of functional groups and the introduction of undesirable impurities to an effluent stream. By virtue of their poor stability, the hydroxide-form, strong base and weak base anion resin particles have heretofore been limited to treating water having a temperature below about 175° F., as will be seen from Table XI, page 140, "Duolite Ion-Exchange Manual," prepared by the technical staff of the Chemical Process Company and published in 1960.

Similarly, strong acid cation exchange resin particles in the hydrogen and ammonium form degrade excessively at temperatures above 180° F., while weak acid cation exchange resin particles in the hydrogen and ammonium form degrade excessively at temperatures above about 212° F., causing loss of functional groups and the introduction of undesirable impurities to an effluent stream. By virtue of their poor stability, the hydrogen- and ammonium-form, strong acid cation exchange resin particles have heretofore been limited to treating water having a temperature below 180° F., while the hydrogen- and ammonium-form weak acid cation exchange resin particles have been limited to treating water having a temperature below 212° F., as will be seen from Table XI, page 140, "Duolite Ion-Exchange Manual," prepared by the technical staff of the Chemical Process Company and published in 1960.

Strong acid cation exchange resin particles in the sodium form have been used at temperatures as high as about 335° F., such as in conjunction with a lime-soda treatment to soften boiler makeup feedwater as disclosed in United States Patent No. 2,701,791. However, sodium-form cation exchange resin particles are not as desirable as the hydrogen- and ammonium-form cation exchange resin particles since they only remove calcium and magnesium ions as is well known in the art.

It is desirable, however, to provide a method whereby hydroxide-form anion exchange resin particles, alone or in combination with cation exchange resin particles, may be utilized to remove impurities from water having a temperature in the range of about 180 to 450° F., as the hydroxide-form anion exchange resins remove silica and weak acids from the water. It is further desirable to provide a method whereby hydrogen- and ammonium-form, strong acid cation exchange resin particles may be utilized to remove impurities from water having a temperature in the range of about 180 to 450° F. It is also desirable to provide a method whereby hydrogen- and ammonium-form, weak acid cation exchange resin particles may be utilized to remove impurities from water having a temperature in the range of about 220 to 450° F. In this manner high temperature condensate water in a steam generating system for an electrical power plant, for example, may be treated with hydroxide-form anion exchange resin particles and/or hydrogen- or ammonium-form, strong acid or weak acid cation exchange resin particles.

It is, therefore, an object of the present invention to provide a method for treating water at a temperature in the range of about 180 to 450° F. with hydroxide-form anion exchange resin particles.

It is a further object of the present invention to provide a method for removing impurities from water at a temperature in the range of about 180 to 450° F. with hydroxide-form, weak base anion exchange resin particles.

It is a still further object of the present invention to provide a method for removing impurities from water at a temperature in the range of about 180 to 450° F. with hydroxide-form, strong base anion exchange resin particles.

It is another object of the present invention to provide a method of treating water at a temperature in the range of about 180 to 450° F. with cation exchange resin particles and hydroxide-form anion exchange resin particles.

It is a further object of the present invention to provide a method of treating water at a temperature in the range of about 180 to 450° F. with cation exchange resin particles in the hydrogen and ammonium form.

It is a still further object of the present invention to provide a method of treating water at a temperature in the range of about 180 to 450° F. with strong acid cation exchange resin particles in the hydrogen and ammonium form.

It is yet another object of the present invention to provide a method of treating water at a temperature in the range of about 220 to 450° F. with weak acid cation exchange resin particles in the hydrogen and ammonium form.

It is still another object of the present invention to provide a method for removing impurities from boiler feed water and/or condensate water having a temperature in the range of about 180 to 450° F. with cation exchange resin particles and hydroxide-form anion exchange resin particles.

It is a further object of the present invention to provide a method for removing iron, copper, nickel, silica and weak acid impurities from water having a temperature in the range of 180 to 450° F.

It is another object of the present invention to remove iron, copper, nickel and other impurities from a condensate water at a temperature in the range of about 180 to 450° F. with a mixed bed of hydrogen- or ammonium-form cation exchange resin particles and hydroxide-form anion exchange resin particles.

These and other objects are realized by the method of the present invention wherein water streams are rendered suitable for treatment with hydroxide-form anion exchange resin particles and/or hydrogen- or ammonium-form cation exchange resin particles at temperatures in the range of about 180 to 450° F. In accordance with the method of the present invention substantially all of the free oxygen is eliminated from the water stream prior to passing the water stream having a temperature in the range of about 180 to 450° F. through the hydroxide-form anion exchange resin particles and/or hydrogen- or ammonium-form cation exchange resin particles. It has been found that by eliminating the free oxygen the effluent water is not contaminated with the high molecular weight organic compounds heretofore given off during high temperature treatment with hydroxide-form anion exchange resin particles and/or hydrogen- or ammonium-form cation exchange resin particles. Accordingly, the present invention affords a method wherein water, such as boiler feed water or condensate water, at a temperature in the range of about 180 to 450° F. and containing iron, copper, nickel, silica, salt or other impurities, may be treated with hydroxide-form anion exchange resin particles and/or hydrogen- and ammonium-form cation exchange resin particles.

As is well known in the art, "strong base anion exchange resin particles" refers to anion exchange resin particles having quaternary ammonium as the principal functional group. "Weak base anion exchange resin particles" refers to anion exchange resin particles having primary amine, secondary amine and/or tertiary amine as the principal functional group.

As is well known in the art, "strong acid cation exchange resin particles" refers to cation exchange resin particles having nuclear sulfonic and/or methylene sulfonic as the principal functional groups. "Weak acid cation exchange resin particles" refers to cation exchange resin particles having carboxylic acid and/or phenolic hydroxyl as the principal functional groups.

The method of the present invention will be discussed in detail with respect to the removal of impurities, such as copper, iron, nickel, silica, salt or the like, from a condensate stream having a temperature in the range of 180 to 450° F. in a steam generating system for an electrical power plant. Free oxygen will inherently be present in the condensate water by virtue of the make-up water which must be added periodically to the steam generating system and by virtue of air leakage into the system. In accordance with the method of the present invention the free oxygen in the condensate water is eliminated or at least substantially reduced to below about 100 parts per billion (p.p.b.). The condensate water, at a temperature in the range of 180 to 450° F., is then passed through a bed comprising a mixture of hydrogen-form, strong acid cation exchange resin particles and hydroxide-form, strong base anion exchange resin particles wherein a substantial amount of the impurities are removed from the condensate water. The anion and cation exchange resin particles do not break down to impart high molecular weight organic compounds heretofore given off to the condensate stream at these high temperatures.

During contacting of the hot condensate stream with the hydroxide-form, strong base anion exchange resin particles, volatile amines having properties similar to ammonia may be released by the anion resin particles. However, these amines are removed by the cation exchange resin particles in the mixed bed. Similarly, the hydrogen-form, strong acid cation exchange resin particles will release sulfonic groups which are removed by the anion exchange resin particles in the mixed bed. Accordingly, the present invention affords a method wherein impurity removal heretofore only achieved at low temperatures may be obtained with hydroxide-form, strong base anion resin particles and/or hydrogen-form, strong acid cation exchange resin particles at a temperature in the range of 180 to 450° F.

The free oxygen in the condensate stream may be eliminated or reduced by mechanical or chemical methods. Suitable mechanical methods for removing free oxygen from the condensate stream, which are well known in the art, include mechanical deaeration with steam, deaeration under low pressures and deaerating condensers, for example.

With respect to the chemical methods for reducing the free oxygen in the hot condensate stream, any well known reducing agent may be employed. The selection of the particular reducing agent for a given system would be within the ordinary skill of one in the art. Suitable reducing agents are, for example, hydrazine and sulfites, such as sodium sulfite. Such reducing agents are added to condensate water and convert the free oxygen into an oxygen-containing compound, such as water or a sulfate. Finely divided carbon may be saturated with hydrazine and used as a bed through which the condensate water is passed to remove the free oxygen.

It may be desirable to maintain a reducing environment while the hot condensate stream contacts the hydroxide-form anion exchange resins. This may be effected by adding an excess amount of reducing agent to assure that all the free oxygen in the condensate stream has been converted to an oxygen-containing compound.

The present method has application to any water stream containing free oxygen that is to be contacted at a temperature in the range of 180 to 450° F. with hydroxide-form, strong base anion exchange resin particles and/or hydrogen-form, strong acid cation exchange resin particles. The present invention also has application to the use of hydroxide-form, weak base anion exchange resin particles and/or ammonium-form, strong acid cation exchange resin particles when it is desirable to treat a water stream at a temperature in the range of about 180 to 450° F. In addition, the present invention has application to the use of ammonium- and hydrogen-form, weak acid cation exchange resin particles when treating a water stream at a temperature in the range of about 220° to 450° F. The treatment of condensate water from a steam generating system of an electrical power plant is exemplary of such an application. The free oxygen content of the water stream should, in both instances, be reduced to below about 100 p.p.b. and more preferably to below about 20 p.p.b. Furthermore, it is preferred when employing mixed beds of anion and cation exchange resin particles that the impurity removal treatment be conducted at a temperature in the range of about 180 to 300° F., more preferably 180 to 250° F. With respect to employing a bed of hydroxide-form anion exchange resin particles, it is preferred that the impurity removal treatment be conducted at a temperature in the range of about 180 to 250° F., more preferably 200 to 220° F. When employing a bed of hydrogen- or ammonium-form, weak acid or strong acid exchange resin particles, it is preferred that the impurity removal treatment be effected at a temperature in the range of about 250 to 410° F., more preferably 250 to 335° F.

Typical solid anion exchange resin particles in the hydroxide form that may be employed in the present invention are the phenol-formaldehyde type, the divinylbenzene-styrene copolymer type, the acrylic type and the epoxy type. The divinylbenzene-styrene copolymer type is preferred. Typical solid cation exchange resin particles that may be employed in the present invention are the divinylbenzene-styrene copolymer type, the arcylic type, the sulfonated coal type and the phenolic type. The divinylbenzene-styrene copolymer type and the acrylic type are preferred. The cation resin particles may be used in the sodium, hydrogen or ammonium form, for example, but it is preferable that the cation resin particles be in the hydrogen or ammonium form, most preferably in the ammonium form. These anion and cation resin compositions are well known in the art in the large bead form, i.e., in the size range of 20 to 50 mesh. For example, such resins are sold in the large bead form under the trade names Amberlite IR-120 and Amberlite IRA-400, manufactured and sold by Rohm & Haas Company, and Nalco HCR and Nalco SBR-P, sold by Nalco Chemical Company.

It has been recently found that anion and/or cation exchange resin particles in the size range of about 60 to 400 mesh, hereinafter referred to as "finely divided" resin particles, will provide improved impurity removal from fluid streams, including water streams. This improved purification process is described in detail in applicant's copending applications, Serial No. 133,670, filed August 24, 1961, now abandoned, and Serial No. 263,999, filed concurrently herewith, which are assigned to the assignee of the present application. The method of the present invention is applicable to these finely divided hydroxide-form, weak base or strong base and finely divided ammonium- and hydrogen-form, weak acid or strong acid cation exchange resin particles, as well as the large bead anion and cation exchange resin particles discussed hereinbefore.

The finely divided resin particles are made by grinding the well known large bead resin particles to the desired size range and regenerated and washed prior to use as with the large bead resin particles. When employing the finely divided resin particles, it is preferred to employ resin particles in the size range of 100 to 400 mesh, and more preferably in the size range of 200 to 400 mesh. It is further preferred that a major portion of the finely divided resin particles comprise, on a weight basis, particles in the size range of 100 to 400 mesh, and more preferably in the size range of 200 to 400 mesh. When the finely divided resin particles are employed as a pre-coat layer on a filter screen, as disclosed in applicant's co-pending applications, Serial No. 133,670 and Serial No. 263,999, referred to above, which is a preferred embodiment of the present invention, it is preferred that the precoat layer have a thickness in the range of about 1/16 to 2 inches, more preferably 1/8 to 1 inch, and most preferably 1/8 to 5/8 inch.

In a mixed bed of anion and cation exchange resin particles in accordance with the present invention, it is preferred that the cation exchange resin particles be present in the amount of about 5 to 95% by weight of the bed to assure that any minute degradation products from the anion resin particles will be picked up by the cation resin particles and vice versa.

Some of the advantages of the present method will be more apparent from the following examples:

*Example I*

A condensate water having a temperature in the range of 275 to 300° F. from a steam generating system of a commercial electrical power plant was utilized in this example. The condensate water contained total impurities of iron, copper and nickel impurities in the order of 15 to 150 p.p.b. The condensate water was passed through a mechanical deaerator utilizing steam. Hydrazine was also added so that the free oxygen content of the condensate water was reduced to 5 to 20 p.p.b. The condensate water was then passed through a mixed bed of cation exchange resin particles and strong base anion exchange resin particles on a 1:1 volume ratio. The cation and anion exchange resin particles were of the divinylbenzene-styrene copolymer type in the size range of 20 to 50 mesh. The anion resin particles were in the hydroxide form. The cation resin particles were in the hydrogen form and strongly acidic.

About 90% of the total impurities of iron, copper and nickel were removed by the mixed bed of exchange resin particles. In addition, the dissolved silica concentration was reduced from 8 to 10 p.p.b. to less than 2 p.p.b. Furthermore, contrary to expectation, there was no significant increase in the organic content of the treated water.

*Example II*

In a pilot plant, a test was conducted with a unit comprising a filter screen coated with about 1/8 inch pre-coat layer of mixed anion and cation resin particles in the size range of 100 to 400 mesh. The anion and cation resin particles were mixed on a weight basis in the ratio of 1:1. The anion and cation resin particles were of the divinylbenzene-styrene copolymer type and a major portion of these resin particles, on a weight basis, were in the size range of 200 to 400 mesh. The finely divided anion resin particles were strongly basic and in the hydroxide form. The finely divided cation resin particles were in the ammonium form and strongly acidic. The filter screen was an annular-shaped, cotton-wound element having an effective porosity of 2 microns.

A condensate water from a steam generating system of a commercial electrical power plant was employed in this test. The condensate water was passed through a mechanical deaerator with steam and hydrazine was also added to reduce the free oxygen content of the condensate water to about 5 to 20 p.p.b.

The condensate water contained 10 to 15 p.p.b. of total copper and 10 to 20 p.p.b. of total nickel and had a temperature of about 274 to 300° F. The condensate water was then passed through the layer of finely divided resin particles and the filter screen. The flow rate was about 2 g.p.m./sq. ft. of filter screen. The effluent contained about 0.2 p.p.b. of total copper and 0.3 p.p.b. of total nickel. Substantial amounts of soluble silica, colloidal, non-dissolved silica and total iron were also removed. There was no increase in organic impurity content in the effluent.

*Example III*

A condensate water having a temperature of about 409° F. from a steam generating system of a commercial electrical power plant was utilized in this example. The condensate was passed through a mechanical deaerator with steam and hydrazine was also added to reduce the free oxygen content of the condensate water to about 10 p.p.b. The high temperature condensate water was then passed through a unit comprising a filter screen coated with an 1/8 inch layer of cation resin particles in the size range of 100 to 400 mesh. The flow rate was 4 g.p.m./sq. ft. of filter screen.

The cation resin particles were of the divinylbenzene-styrene copolymer type and a major portion of these resin particles, on a weight basis, were in the size range of 200 to 400 mesh. The finely divided cation resin particles were strongly acidic and in the ammonium form. The filter screen was an annular-shaped filter screen element having an effective porosity of 10 microns.

The condensate effluent showed a substantial reduction in the total iron impurities and no increase in the organic content of condensate water.

*Example IV*

A commercial operation was conducted on a system comprising a plurality of filter screens coated with about ⅛ to ¼ inch pre-coat layer of mixed anion and cation resin particles in the size range of 100 to 400 mesh. The filter screens were annular-shaped, cotton-wound elements having an effective porosity of 2 microns. The anion and cation resin particles were mixed on a weight basis in the ratio of 1:1. The anion and cation resin particles were of the divinylbenzene-styrene copolymer type and a major portion of these resin particles, on a weight basis, were in the size range of 200 to 400 mesh. The finely divided anion resin particles were strongly basic and in the hydroxide form. The finely divided cation resin particles were in the ammonium form and strongly acidic.

A condensate water from a steam generating system of a commercial electrical power plant was passed through a mechanical deaerator and hydrazine was also added to reduce the free oxygen content of the condensate water to less than 10 p.p.b.

The condensate water contained 4 to 6 p.p.b. of total copper, 5 to 10 p.p.b. of total iron, and about 30 p.p.b. of total silica and had a temperature of about 208° F. The condensate water was then passed through the filtering system at a flow rate of about 1,400 g.p.m. The effluent contained less than 2 p.p.b. of total copper and total iron and less than 8 p.p.b. of total silica. There was no increase in organic impurity content in the effluent.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. A method for removing impurities from water having a temperature in the range of about 180 to 450° F., said water having free oxygen therein, which comprises reducing the free oxygen content of said water to below about 100 p.p.b. and passing said water through anion exchange resin particles in the hydroxide form.

2. The method of claim 1 wherein said anion exchange resin particles are of the type selected from the group consisting of divinylbenzene-styrene copolymer type, acrylic type and the epoxy type.

3. The method of claim 1 wherein said anion exchange resin particles are in the size range of about 60 to 400 mesh.

4. The method of removing contaminants from water having a temperature in the range of about 180 to 450° F., said water having free oxygen therein, which comprises substantially eliminating said free oxygen in said water and passing said water through strong acid cation exchange resin particles in the hydrogen form.

5. The method of claim 4 wherein said free oxygen content of said water is reduced to below about 100 p.p.b. before passing said water through said cation exchange resin particles.

6. The method of claim 4 wherein said cation exchange resin particles are in the size range of about 60 to 400 mesh.

7. The method of removing contaminants from water having a temperature in the range of about 180 to 450° F., said water having free oxygen therein, which comprises substantially eliminating said free oxygen in said water and passing said water through strong acid cation exchange resin particles in the ammonium form.

8. The method of claim 7 wherein said free oxygen content of said water is reduced to below about 100 p.p.b. before passing said water through said cation exchange resin particles.

9. The method of claim 7 wherein said cation exchange resin particles are in the size range of 60 to 400 mesh.

10. The method of removing contaminants from water having a temperature in the range of about 220 to 450° F., said water having free oxygen therein, which comprises substantially eliminating said free oxygen in said water and passing said water through weak base cation exchange resin particles.

11. The method of claim 10 wherein said free oxygen content of said water is reduced to below about 100 p.p.b. before passing said water through said cation exchange resin particles.

12. The method of claim 10 wherein said cation exchange resin particles are in the size range of about 60 to 400 mesh.

13. The method of claim 12 wherein said cation exchange resin particles are deposited on a filter screen as a pre-coat layer.

14. The method of claim 10 wherein said cation exchange resin particles are in the hydrogen form.

15. The method of claim 10 wherein said cation exchange resin particles are in the ammonium form.

16. The method of removing impurities from water having a temperature in the range of 180 to 450° F. comprising the steps of substantially removing free oxygen from said water and passing said water through a mixed-bed of anion exchange resin particles in the hydroxide form and cation exchange resin particles.

17. The method of removing impurities from water having a temperature in the range of about 180 to 450° F. comprising the steps of substantially removing free oxygen from said water and passing said water through a mixed bed of anion exchange resin particles and strong acid cation exchange resin particles in the ammonium form.

18. The method of removing impurities from water having a temperature in the range of about 180 to 450° F. comprising the steps of substantially removing free oxygen from said water and passing said water through a mixed bed of anion exchange resin particles and strong acid cation exchange resin particles in the hydrogen form.

19. The method of removing impurities from water having a temperature in the range of 220 to 450° F. comprising the steps of substantially removing free oxygen from said water and passing said water through a mixed bed of anion exchange resin particles and weak acid cation exchange resin particles.

20. The method of claim 19 wherein said cation exchange resin particles are in the ammonium form.

21. The method of claim 19 wherein said cation exchange resin particles are in the hydrogen form.

22. The method of removing iron, copper, nickel, and silica from boiler feed water having a temperature in the range of 180 to 450° F. comprising the steps of substantially eliminating free oxygen from said boiler feed water and passing said boiler feed water through a mixture of cation and anion exchange resin particles, said anion exchange resins being strong base anion exchange resin particles and in the hydroxide form and said cation exchange resin particles being strong acid cation exchange resin particles and in the ammonium form.

23. The method of claim 22 wherein said mixture of cation and anion exchanges resin particles is in the form of a pre-coat layer deposited upon a filter screen, said resin particles being in the size range of 60 to 400 mesh.

24. In a steam generating system for an electric power plant the method of removing iron, copper, nickel, silica, heavy metals, and salts from condensate water having a temperature from 180 to 450° F. comprising the steps of substantially removing free oxygen from the condensate water, and passing said condensate water through a filter screen having coated thereon a layer of mixed cation and anion exchange resin particles in the size range of 60 to 400 mesh, said anion resin particles being strong base anion exchange resin particles and in the hydroxide form and said cation exchange resin particles being strong acid cation exchange resin particles and in the ammonium form.

References Cited by the Examiner

UNITED STATES PATENTS

| | | | |
|---|---|---|---|
| 2,323,990 | 7/1943 | Gerb | 210—26 X |
| 2,701,791 | 2/1955 | Lindsay | 210—28 |
| 3,051,651 | 8/1962 | Haagen | 210—32 |

FOREIGN PATENTS 533,148  11/1958  Canada.

OTHER REFERENCES

Kunin: "Elements of Ion Exchange," copyright 1960, by Reinhold Publishing Co., New York, N.Y., pages 26–38 relied upon.

Samuelson: "Ion Exchange Separations in Analytical Chemistry," copyright in 1963, by John Wiley and Sons, Inc., New York, N.Y., pages 149–157 relied upon.

MORRIS O. WOLK, *Primary Examiner.*

EDWARD G. WHITBY, *Assistant Examiner.*

PO-1050
(5/69)

UNITED STATES PATENT OFFICE
CERTIFICATE OF CORRECTION

Patent No. 3,250,705  Dated May 10, 1966

Inventor(s) Joseph A. Levendusky

It is certified that error appears in the above-identified patent and that said Letters Patent are hereby corrected as shown below:

Column 8, line 11, change "base" to -- acid --.

Signed and Sealed
NOV 3 1970

(SEAL)
Attest:

Edward M. Fletcher, Jr.
Attesting Officer

WILLIAM E. SCHUYLER, JR.
Commissioner of Patents